United States Patent Office 3,367,319
Patented Feb. 6, 1968

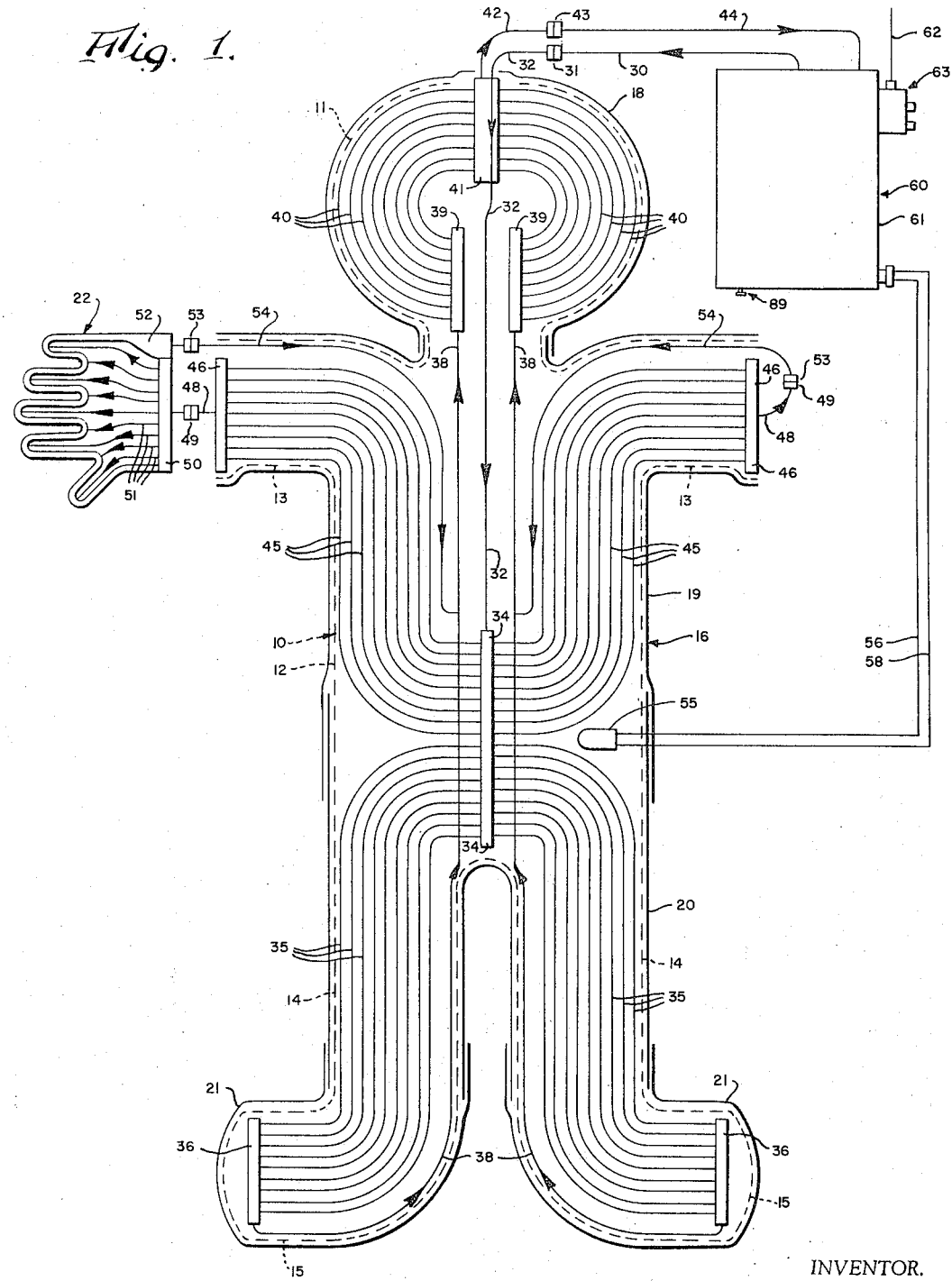

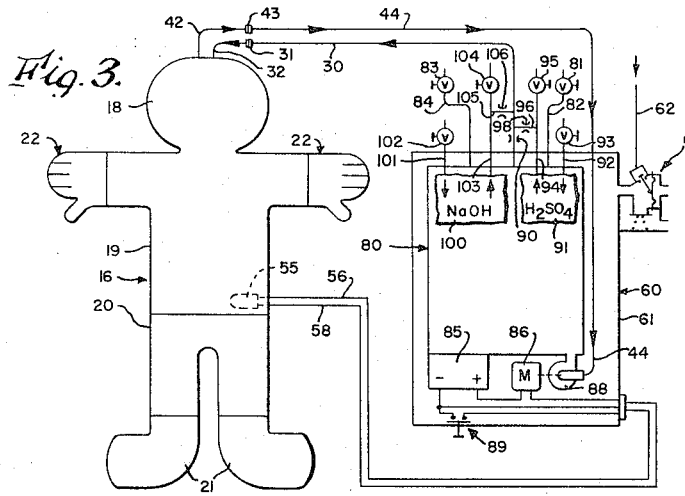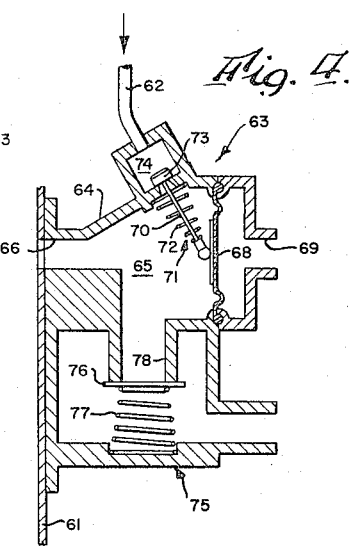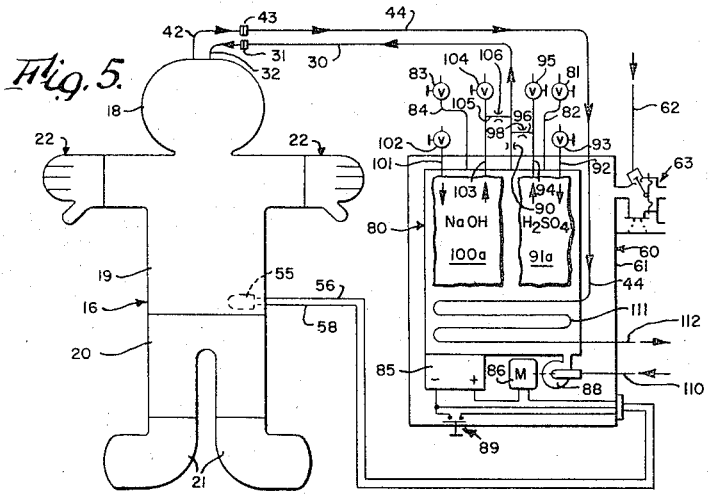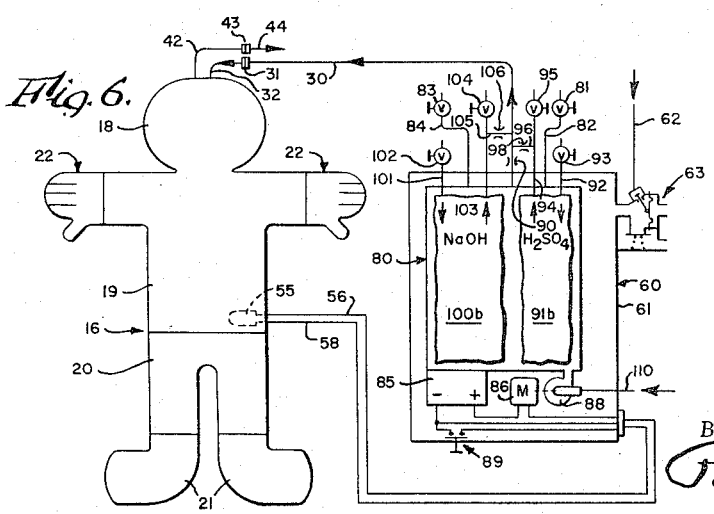

3,367,319
APPARATUS FOR HEATING A DIVER CLOTHED
IN A SUIT AND IMMERSED IN COLD WATER
William J. Carter, Jr., Williamsville, N.Y., assignor to
The Firewel Company, Inc., Buffalo, N.Y., a corporation of Ohio
Filed Nov. 9, 1966, Ser. No. 593,026
15 Claims. (Cl. 126—204)

This invention relates to heating the suit of a diver immersed for a long period of time in cold water and more particularly to apparatus in which the heat source is sulfuric acid reacting exothermically with another liquid, such as the cold water in which the diver is immersed or with sodium hydroxide, or both.

Thermal protection by supplying heat to a diver immersed in cold water is essential to any substantial stay of the diver in the cold water, long periods of immersion being increasingly required in longer and longer duration with the present expansion of activity in undersea work.

Such supply of heat has heretofore been supplied through umbilical cords or hoses either in the form of hot water or electricity from a remote source. Umbilical cords or hoses are, however, extremely disadvantageous in restricting the zone of activity of the diver to the distance from the source determined by the length of the umbilical, and by interference of the umbilical itself with his manual activity as well as his ability to move in and around submerged objects.

Electric batteries, as a heat source, carried by the diver have also been proposed but have the disadvantage of both heavy weight and large bulk with resulting underwater drag and interference with the activity and ability of the diver to pass underwater obstacles.

An important object of the invention is to provide an adequate heating supply such as will provide, say, a 6 hour dive or immersion in 0° C. water at a heat debt rate of 200 kilo-calories per hour in maintaining the temperature of the interior of the suit at about 26° C. This exemplary set of conditions may, of course, be widely varied and a smaller or greater heat supply can be provided by merely decreasing or increasing the increments of sulfuric acid and reacting liquid used.

Other objects are to provide such apparatus (a) in which the cost of the materials used is comparable with the cost of recharging heat source batteries, both sulfuric acid and sodium hydroxide being cheap and highly effective; (b) which gives the diver complete autonomy; (c) is both light in weight and low in bulk so that it can be conveniently attached to the suit at a point of minimum underwater drag and interference with the diver's manual activity and manueverability; (d) in which the mixed sulfuric acid and reacting liquid can be recirculated in a closed circuit so that there is no heat loss except from the surface of the suit; (e) in which, on the other hand, the spent products of reaction can be discharged harmlessly into the cold water in which the diver is immersed in very diluted form either directly or after having been brought into heat exchange relation with the incoming sea water serving in the reaction so as to conserve heat; (f) in which the rate of heat supplied can be accurately controlled, as by a thermostat within the diver's suit; (g) in which the depletion of the sulfuric acid and reacting liquid does not materially affect the buoyancy of the apparatus; (h) in which the heat exchange with the body of the diver is readily effected, the mixed sulfuric acid and reacting liquid being conducted through tubes within the diver's suit; (i) in which the cold sea water is caused to serve in providing the required heat source as well as the heat sink; and (j) is simple in construction and reliable in operation and will stand up under conditions of severe and constant use without getting out of order or requiring repairs.

Other objects and advantages of the invention will be apparent from the following description and drawings in which FIG. 1 is a simplified diagrammatic representation of the undergarment and outer gear of a diver's suit and showing the general arrangement of the tubes for conducting the heated liquid from a chemical pack in heat exchange relation with the body of the diver.

FIG. 2 is an enlarged section through these tubes and the undergarment to which they are attached and through the outer wet suit of the diver.

FIG. 3 illustrates the components of the chemical pack which supplies the heated liquid to the diver's suit which is illustrated in diminutive form as compared with FIG. 1.

FIG. 4 is an enlarged section of the regulator and relief valve for the chemical pack shown in FIGS. 1 and 3.

FIGS. 5 and 6 are views similar to FIG. 3 showing modified forms of the invention.

*Diver's suit and its heat exchange system*

The diver is clothed in a cloth undergarment 10 having hood, torso, arm, leg and foot portions 11, 12, 13, 14, 15, respectively, this undergarment being shown by dotted lines in FIG. 1 and in enlarged cloth section in FIG. 2. The outer garment 16 is shown as being in the form of separable hood, jackets, pants, boot and glove sections 18, 19, 20, 21, 22, respectively, these outer garments being loosely joined together so that water 23 can enter the suit and come in contact with the body of the diver. The gloves 22 of the outer garment are preferably quickly detachable to free the hands of the diver for ungloved underwater work and each of these gloves has a separate manifold and system of tubing for heating the gloved hands of the diver as will be hereinafter explained.

The system of flexible heat exchange tubes built into the undergarment 10 for heating the body of the diver is identical for all forms of the invention and hence a description of one will be deemed to apply to all. The warm liquid is supplied from the chemical pack via line 30 through a disconnect 31 to a line 32 leading to a main supply manifold 34 suitably attached to the middle portion of the diver's undergarment 10. From this manifold a series of flexible heat exchange tubes 35 extend in spaced relation to one another along the leg and foot portions 14, 15 of the diver's undergarment to manifold 36 attached to these foot portions. As best shown in FIG. 2, these tubes are preferably stitched to the exterior of the cloth forming the undergarment 10 on the exterior side thereof so as to be immersed in the water 23 between the body of the diver and the outer garment 16 so that the heat of the liquid passing through these tubes is transmitted through this water to the body of the diver. A return line 38 receives the warm liquid from each boot manifold 36 and conducts it to a pair of manifolds 39 attached to the hood portion 11 of the undergarment 10. Flexible heat exchange tubes 40 stitched in spaced relation to the exterior of the hood portion 11 of the diver's undergarment 10 conduct this warm liquid in heat exchange relation to the diver's head to an outlet manifold 41. The outlet line 42 from this manifold 41 is attached by a quick disconnect 43 to the return line 44 to the chemical pack, this line 44 discharging, in the modified form of the invention shown in FIG. 6, into the water in which the diver is immersed, as hereinafter explained.

To heat the torso, arms and hands of the diver, a plurality of flexible heat exchange tubes 45 are stitched in spaced relation to one another to the exterior of the torso portion 12 of the diver's undergarment and these tubes continue along the two sleeve portions 13. The inlet ends of these tubes are connected with the supply manifold 34 and the outlet ends discharge into a wrist manifold 46 at each wrist portion of the diver's undergarment. Each manifold 46 is connected via a line 48 and quick disconnect 49 with a glove inlet manifold 50 attached to each glove portion 22 of the diver's outer garment 16. A plurality of flexible heat exchange tubes 51 within each glove portion 22 circulate the fluid in heat exchange relation with the diver's hand to a glove outlet manifold 52 connected through a quick disconnect 53 to a flexible line 54 in the sleeve portion 13 of the diver's undergarment and which discharges the heated liquid into the return line 38.

In each form of the invention a thermostat 55 attached to the diver's undergarment 10 has control lines 56 and 58 leading to the chemical pack so that the generation of heat by the chemical pack is regulated in accordance with the demand of the diver in maintaining the interior of the diver's suit at the assumed 26° C.

Chemical pack, FIGS. 1-4

With the form of the invention shown in FIGS. 1-4 the chemical pack is designated at 60 and is shown as comprising an outer rigid gas box 61 sealed against the entry of the water in which the diver is immersed and filled with air or other suitable gas supplied from a pressurized air line 62 connecting with the pressurized air supply of conventional breathing apparatus (not shown). The air or gas pressure within the gas box 61 corresponds to and is maintained slightly higher than, the ambient sea water pressure and to this end an air pressure regulator and relief valve, indicated generally at 63, is provided. As best shown in FIG. 4 this valve comprises a hollow body 64 providing a chamber 65 communicating at one side, as indicated at 66, with the interior of the gas box 61 and having one wall in the form of a flexible diaphragm 68 the opposite side of which is exposed to the pressure of the water in which the diver is immersed via a vent opening 69 in the body 64. This diaphragm 68 actuates the stem 70 of a tilt valve 71 which is normally held in a closed condition by a spring 72. This tilt valve has a valve head 73 within an inlet chamber 74 connected to the air pressure supply line 62. When the valve head 73 is tilted, air is permitted to pass from the air pressure line 62 through the chamber 74 and along the stem 70 of the tilt valve into the chamber 65 and thence into the interior of the gas box 61 thereby to increase the pressure in this chamber 65 and gas box 61 and also to move the diaphragm 68 outwardly to release the tilt valve 71 to its normal closed condition. The relief valve section 75 of the regulator and relief valve 63 is shown as being in the form of a spring loaded disk 76 pressed by a helical compression spring 77 against a seat surrounding the opening 78 through an outlet neck of the valve body 64 so that when the air pressure within the gas box 61 exceeds a predetermined value as compared with the surrounding sea water, the valve disk 76 will open to relieve this pressure. Preferably this value is such that the air pressure within the gas box 61 is maintained approximately two inches of water above the surrounding sea water pressure.

The gas box contains a water box 80 which is sealed against escape of liquid therefrom into the air contained within the gas box 61. This water box 80 has a water fill valve 81 in a fill line 82 from the exterior of the chemical pack and has a vent valve 83 in a vent line 84 leading to the exterior of the chemical pack so that the water contained within the water box 80 can be replaced and removed. To the exterior of this water box 80 is attached a battery 85 which is preferably of the rechargeable type and which vents into the air contained within the gas box 61 so that battery fumes are discharged via the relief valve section 75 into the sea water. This battery drives a motor 86 which in turn drives a pump 88, the energization of this motor being under control of an on-off switch 89. The energization of this motor 86 is also under control of the lines 56, 58 from the body thermostat 55. The pump 88 has its inlet connected to the outlet line 44 from the diver's suit and discharges into the interior of the water box 80. The inlet line 30 to the diver's suit connects with the interior of the water box 80 and contains a restricted orifice 90.

The water box 80 contains a collapsible plastic bag 91 filled with sulfuric acid. This bag is provided with a fill line 92 from the exterior of the chemical pack and containing a manual fill valve 93. The outlet line 94 from the sulfuric acid bag 91 has an acid vent valve 95 and connects via a branch 96 containing a restricted orifice 98 with the line 30 on the downstream side of the restricted orifice 90.

The collapsible plastic bag 100 for liquid sodium hydroxide is provided with a fill line 101 including a fill valve 102 and is also provided with an outlet and vent line 103 provided with a vent valve 104. A branch 105 containing a restricted orifice 106 connects the outlet line 103 to the inlet line 30 to the suit at a point downstream from its orifice 90.

Operation—FIGS. 1-4

In the operation of the form of the invention shown in FIGS. 1-4, the water box 80 has been filled with water via its fill line 82; the collapsible plastic sulfuric acid bag 91 has been filled to a distended condition through its fill line 92; and the collapsible plastic sodium hydroxide bag 100 has been filled and distended via its fill line 101, all of these being vented, of course, during such filling. On descending into the cold sea water, this seeps past the edges of the different portions of the outer garment 16 and through the fabric of the under garment 10 into contact with the body of the diver as illustrated at 23, FIG. 2. This cold water activates the thermostat 55 to close a circuit from the battery 85 through the motor 86 thereby to activate the pump 88. This pump draws liquid from the outlet line 44 of the system of heat exchange tubes attached to the undergarment 10 and discharges this liquid into the rigid water box 80. Accordingly increments of water are forced from this rigid box past the restriction 90 into the inlet line 30 to the system of heat exchange tubes attached to the undergarment 10. At the same time, the discharge from the pump 88 builds up water pressure in the water box 80 and this pressure is impressed both on the collapsible plastic bag 91 for the sulfuric acid and also the collapsible plastic bag 100 for the sodium hydroxide. Accordingly corresponding increments of sulfuric acid are expelled from the bag 91 out through the outlet and vent line 94 and through the branch 96 and restricted orifice 98 into the line 30 now conducting water to the system of heat exchange tubes attached to the undergarment 10. The heat of solution of the sulfuric acid so coming in contact with the water heats the mixture so that the mixture supplied to this system of heat exchange tubes is warmed. The pressure impressed upon the collapsible plastic bag 100 expels corresponding increments of the sodium hydroxide from this bag out through the outlet and vent line 103 and through the branch line 105 and its restricted orifice 106 into the line 30 now conducting the mixture of water and sulfuric acid. The heat of reaction of the sodium hydroxide with the warm acid solution raises the temperature of the liquid supplied to the system of heat exchange tubes attached to the undergarment 10 of the diver. Desirably this temperature can be approximately 45° C. on entering the diver's suit and the reaction products are a dilute neutral salt solution, namely, sodium sulphate.

This warm solution passes through the line 32, FIG. 1, to the inlet manifold 34 where it is distributed to the various flexible heat exchange tubes 35 stitched to the leg and boot portions 14, 15 of the undergarment 10 thereby to heat the water 23 surrounding the legs and feet of the diver. In each boot portion of the diver's suit this water from these tubes 35 enters the manifold 36 and is conducted via the corresponding line 38 to the inlet manifold 39 for the flexible heat exchange tubes 40 which are stitched to the helmet portion 11 of the undergarment 10. The liquid from these heat exchange tubes 40 is discharged into the outlet header 41 and thence via the line 42 into the return line 44 to the chemical pack 60, this line leading to the inlet of the pump 88 which recirculates the liquid through this circuit.

Another part of the heated liquid so forced into the inlet header 34, FIG. 1, passes through the flexible heat exchange tubes 45 stitched to the torso and arm portions 12 and 13 of the diver's suit so as to warm the water 23 surrounding the upper part of the body and the arms of the diver. This liquid enters the wrist manifold 46 at each wrist of the diver and with each glove 22 attached, by means of the quick disconnects 49 and 53, is conducted through the line 48 into the inlet manifold 50 of each glove. From this manifold the liquid circulates through the flexible heat exchange tubes 51 in each glove to heat the hands of the diver, following which the liquid enters the outlet manifold 52 of each glove and flows via the line 54 into the corresponding line 38 to join the liquid being supplied to the hood portion 11 of the diver's undergarment as previously described.

At any time the diver can detach either of his gloves 22 to permit the use of his bare hands and in doing so he removes his gloves and joins together the suit portions of the disconnects 49 and 53 previous serving the gloves which have been detached. Accordingly the flexible heat exchange tubes 45 serving that side of the suit from which either glove has been detached will continue in the service to maintain the desired temperature of the suit.

The thermostat 55 operates to energize and deenergize the pump motor 86 thereby to control the flow of water, sulfuric acid and sodium hydroxide released from the water box 80, collapsible plastic bag 91 for the sulfuric acid, and collapsible plastic bag 100 for the sodium hydroxide into the inlet line 30 of the suit. This thermostat thereby serves to maintain the desired internal suit temperature at the assumed 26° C. During operation, of course, the sulfuric acid and sodium hydroxide are gradually consumed and hence the collapsible plastic bags 91 and 100 reduce in size. However, since the heating liquid circuit is a closed circuit, the weight of the liquid in the system is constant and hence there is no change in buoyancy of the suit or the chemical pack.

As the diver descends the water pressure increases thereby to move the bellows 68 of the regulator and relief valve 63 inwardly so as to tilt the tilt valve 71. This tilts the valve head 73 to permit pressurized air from the breathing system to enter from supply line 62 and valve chamber 74 into the main chamber 65 for this regulator and relief valve thereby, via the passage 66, pressurizing the interior of the rigid gas box 61. When the pressure in this gas box reaches a value of, say, 2 inches of water higher than the surrounding sea pressure, this pressure returns the diaphragm 68 so as to release the tilt valve 71 and cuts off the further admission of pressurized air. As the diver ascends in the water the sea water pressure reduces and the pressure within the gas box 61 is reduced to a corresponding degree via the pressure relief valve section 75, the valve head 76 opening against the resistance of its spring 77. The air so relieved into the sea water carries with it all fumes developing from the operation of the storage battery 85.

Chemical pack—FIG. 5

The form of the invention shown in FIG. 5 is an open circuit system, that is, the water in which the diver is immersed is used in the reaction with the sulfuric acid and/ or sodium hydroxide to develop the heat and the spent solution is discharged as a dilute neutral salt solution back into the sea. However, with the form of the invention shown in FIG. 5 the outgoing warm solution is brought into heat exchange relation with the cold incoming sea water so as to conserve heat. Thus, the inlet line 110 to the pump 88 extends through the wall of the rigid gas box 60 to be supplied with sea water and the outlet line 44 from the system of flexible heat exchange tubes stitched to the undergarment 10 of the diver passes through a heat exchanger 111 in the water box 80. By this arrangement the incoming cold sea water is warmed by the outgoing spent solution to reduce the quantity of sulfuric acid and sodium hydroxide required to maintain the desired suit temperature. It will also be noted that with this system larger collapsible plastic bags 91a and 100a can be employed, within the same size of water box 80, since this water box is not required to store a supply of water for the exothermic reaction, such water being supplied from the sea. In other respects the form of the invention shown in FIG. 5 is identical with the form of the invention shown in FIGS. 1–4 and the same reference numerals have therefore been employed and a description of their parts and operation will not be repeated. It will be observed that the form of the invention shown in FIG. 5 has the advantage of it being unnecessary to fill the water box 80 with water before descending into the sea and also, with the same size of wet box 80 it is possible to carry a much larger quantity of sulfuric acid and sodium hydroxide. On the other hand, this form of the invention has the disadvantage of a higher heat loss as compared with FIGS. 1–4, since in addition to the heat escaping through the surface of the suit to the sea, the discharge from the line 112 of the solution into the sea is at a much higher temperature, namely in the order of 15° C., than the sea water which can be at 0° C. in cold water work. Another disadvantage is that venting the sulfuric acid and sodium hydroxide creates a change in buoyancy of the chemical pack.

The net heating effects for similar sizes of chemical packs of the form shown in FIGS. 1–4 as compared with that shown in FIG. 5 is, however, about the same. Thus, while heat is wasted by venting the spent solution into the sea in the form of FIG. 5, its water box 80 accommodates larger collapsible plastic bags 91a and 100a for the sulfuric acid and sodium hydroxide as the fuel.

Chemical pack—FIG. 6

The form of the invention shown in FIG. 6 is identical with that shown in FIG. 5 except that the heat exchanger 111 is eliminated, the water for the reaction being supplied to the pump 88 via the line 110 and the outlet line 44 from the diver's suit discharging the dilute spent neutral salt solution directly back into the sea. This system therefore has the disadvantage of still higher heat loss, but has the advantage of accommodating the largest collapsible plastic bags 91b and 100a within a set box 80 of a given size since it is unnecessary to use any part of the space within this wet box for a heat exchanger. In other respects the form of the invention shown in FIG. 6 is identical with the other forms of the invention shown. Also, as with FIG. 6, venting the expendibles to the sea changes the buoyancy of the pack and is not advantageous.

As previously indicated, the outlet line 42 for the spent solution in FIG. 6 discharges directly into the sea, the pump 88 being supplied with sea water via its inlet line 110, as with the form of the invention shown in FIG. 5. By the elimination of the heat exchanger 111 shown in FIG. 6, the full interior space of the water box 80 is available for the collapsible plastic sulfuric acid and sodium hydroxide bags 91b and 100b. Accordingly these bags are larger, for the same size water box, than those shown in either FIGS. 1–4 or FIG. 5 and hence the diver starts out with a larger supply of fuel. Accordingly while the spent solution is vented directly to the sea at a temperature of, say, 30° C., with a consequent heat loss, the net heating effect for the same size of chemical pack for the form of the invention shown in FIG. 6 is about the same as the other forms of the invention. Thus while more heat is wasted by venting the spent solution into the sea from the suit, FIG. 6, the water box 80 accommodates still larger collapsible plastic bags 91b and 100b for the sulfuric acid and sodium hydroxide as the fuel.

From the foregoing it will be seen that the present invention has the advantages and achieves the various objectives set forth.

I claim:

1. Apparatus including a suit for heating a diver immersed in cold water, which comprises means confining a liquid body of acid, pump means expelling increments of such acid from said body, means mixing said increments of acid with a liquid with which said acid acts exothermically, and means conducting such mixed increments into said suit and in heat exchange relation with the body of the diver.

2. Apparatus as set forth in claim 1 wherein said acid is sulfuric acid and said liquid with which said acid acts exothermically is water.

3. Apparatus as set forth in claim 1 additionally including thermostat means responsive to the internal temperature of said suit for varying the rate of flow of at least one of said increments.

4. Apparatus as set forth in claim 1 additionally including means confining a body of liquid sodium hydroxide and expelling increments of said sodium hydroxide from said last named body into admixture with said increments of acid.

5. Apparatus as set forth in claim 4 wherein each of said confining means comprises a collapsible bag immersed in a fluid pressurized to effect such expulsion of the contents thereof.

6. Apparatus as set forth in claim 5 wherein said fluid is said liquid with which said acid acts exothermically.

7. Apparatus as set forth in claim 6 additionally including a liquid box containing said collapsible bags immersed in said liquid with which said acid acts exothermically, and means conducting said mixed increments, following such heat exchange with the body of the diver, into said liquid box to pressurize said collapsible bags.

8. Apparatus as set forth in claim 7 additionally including a gas box, a storage battery in said gas box, and an electric motor actuated by said battery and driving said pump.

9. Apparatus as set forth in claim 8 additionally including a gas pressure supply means, and means maintaining the gas pressure in said gas box a predetermined value above the pressure of the water in which the diver is immersed through gas derived from said gas pressure supply means and by venting excess gas from said gas box into the water in which the diver is immersed.

10. Apparatus as set forth in claim 6 additionally including a liquid box containing said collapsible bags immersed in said liquid with which said acid acts exothermically and having an inlet through which the water in which the diver is immersed is admitted to said liquid box, and means conducting the spent mixed increments, following such heat exchange with the body of the diver, into the water in which the diver is immersed.

11. Apparatus as set forth in claim 10 additionally including a heat exchanger between the incoming sea water to the liquid box and the spent mixed increments being discharged into the sea.

12. Apparatus as set forth in claim 10 additionally including a gas box, a storage battery in said gas box and an electric motor actuated by said battery and driving said pump.

13. Apparatus as set forth in claim 12 additionally including a gas pressure supply means, and means maintaining the gas pressure in said gas box a predetermined value above the pressure of the water in which the diver is immersed through gas derived from said gas pressure supply means and by venting excess gas from said gas box into the water in which the diver is immersed.

14. Apparatus for heating a diver comprising a suit having torso and sleeve portions and means circulating a heated liquid through said torso portion and to and from conduits at the extremities of said sleeve portions in heat exchange relation with the torso and arms of the diver, at least one separate glove having a conduit for conducting such heated liquid in heat exchange relation with the corresponding hand of the diver, a first quick disconnect having one part connected with one conduit of said sleeve extremity and a mating part connected with one end of the conduit in said glove and a second disconnect having one part connected with the other conduit of said sleeve and a mating part connected with the other conduit of said sleeve extremity and a mating part connected with the other end of said conduit in said glove whereby heated liquid circulating through said torso and arm portions is also circulated through said one glove which is, however, detachable.

15. Apparatus as set forth in claim 14 wherein said one part of said first quick disconnect and said one part of said second quick disconnect can be coupled together to preserve the flow of said heated liquid through the arm portion associated with said one glove after said one glove has been detached.

References Cited

UNITED STATES PATENTS

| | | | |
|---|---|---|---|
| 3,182,653 | 5/1965 | Mavleos et al. | 126—204 |
| 3,289,748 | 12/1966 | Jennings | 165—46 |
| 3,295,594 | 1/1967 | Hopper | 165—46 |

FREDERICK L. MATTESON, Jr., *Primary Examiner.*

E. G. FAVORS, *Assistant Examiner.*

UNITED STATES PATENT OFFICE
CERTIFICATE OF CORRECTION

Patent No. 3,367,319                      February 6, 1968

William J. Carter, Jr.

It is certified that error appears in the above identified patent and that said Letters Patent are hereby corrected as shown below:

Column 2, line 28, "jackets" should read -- jacket --. Column 6, line 48, "100a" should read -- 100b --; line 48, "set" should read -- wet --. Column 8, lines 30 and 31, cancel "other conduit of said sleeve and a mating part connected with the".

Signed and sealed this 28th day of October 1969.

(SEAL)
Attest:

Edward M. Fletcher, Jr.                      WILLIAM E. SCHUYLER, JR.
Attesting Officer                              Commissioner of Patents